United States Patent
Nelson et al.

(10) Patent No.: US 12,511,353 B2
(45) Date of Patent: Dec. 30, 2025

(54) CREATING LICENSE DONGLES IN THE FIELD

(71) Applicant: IGT, Las Vegas, NV (US)

(72) Inventors: Dwayne Nelson, Las Vegas, NV (US); Derek J. Plowman, Reno, NV (US)

(73) Assignee: IGT, Las Vegas, NV (US)

( * ) Notice: Subject to any disclaimer, the term of this patent is extended or adjusted under 35 U.S.C. 154(b) by 751 days.

(21) Appl. No.: 17/730,713

(22) Filed: Apr. 27, 2022

(65) Prior Publication Data

US 2023/0350981 A1    Nov. 2, 2023

(51) Int. Cl.
*G06F 21/10* (2013.01)
*A63F 13/23* (2014.01)
*A63F 13/73* (2014.01)
*G06F 21/12* (2013.01)

(52) U.S. Cl.
CPC ............ *G06F 21/105* (2013.01); *A63F 13/23* (2014.09); *A63F 13/73* (2014.09); *G06F 21/123* (2013.01); *A63F 2300/532* (2013.01); *G06F 21/1011* (2023.08)

(58) Field of Classification Search
CPC .. G06F 21/105; G06F 21/123; G06F 21/1011; A63F 13/23; A63F 13/73; A63F 2300/532
USPC .......................................................... 726/9
See application file for complete search history.

(56) References Cited

U.S. PATENT DOCUMENTS

| | | | | |
|---|---|---|---|---|
| 8,423,779 B2 * | 4/2013 | Hamlin | ................... | G06F 21/73 713/176 |
| 8,805,743 B2 * | 8/2014 | Bantz | ..................... | G06Q 10/08 705/51 |
| 8,858,323 B2 * | 10/2014 | Nguyen | .................. | G07F 17/32 463/29 |
| 8,961,306 B2 * | 2/2015 | LeMay | .................... | G07F 17/32 463/31 |
| 9,147,313 B2 * | 9/2015 | Nelson | ................ | G07F 17/3255 |
| 9,773,376 B2 * | 9/2017 | Rajput | ................ | G07F 17/3251 |
| 10,152,846 B2 * | 12/2018 | Kiely | ........................ | G07F 17/32 |
| 11,294,990 B2 * | 4/2022 | Todd | ........................ | G06F 21/64 |
| 2003/0135756 A1 * | 7/2003 | Verma | ..................... | G06F 21/10 705/59 |
| 2005/0278716 A1 * | 12/2005 | Koppen | ................ | G06F 21/121 717/174 |
| 2006/0211490 A1 * | 9/2006 | Falvey | .................. | G06F 21/123 463/29 |

(Continued)

*Primary Examiner* — Samson B Lemma
(74) *Attorney, Agent, or Firm* — Sage Patent Group

(57) ABSTRACT

An electronic gaming machine ("EGM") includes a processor circuit, a port coupled to the processor circuit, and a memory coupled to the processor circuit. The port is configured to communicatively couple to a license dongle. The license dongle is configured to store a license associated with a game. The license is usable to allow the game to be played on the EGM. The memory includes machine-readable instructions that, when executed by the processor circuit, cause the EGM to perform operations. The operations include providing an identifier of the license dongle to a separate entity. The operations further include, responsive to providing the identifier of the license dongle, receiving an indicator of the license associated with the game. The operations further include initiating the game on the EGM using the license.

20 Claims, 12 Drawing Sheets

(56) References Cited

U.S. PATENT DOCUMENTS

| | | | | |
|---|---|---|---|---|
| 2007/0226149 A1* | 9/2007 | McFarlin | ............... | G06Q 99/00 |
| | | | | 705/59 |
| 2008/0228513 A1* | 9/2008 | McMillan | ............. | G06F 21/105 |
| | | | | 726/2 |
| 2009/0143128 A1* | 6/2009 | Cautley | ................. | G07F 17/329 |
| | | | | 463/17 |
| 2009/0191961 A1* | 7/2009 | McCoull | ............... | G06F 21/123 |
| | | | | 463/29 |
| 2009/0233709 A1* | 9/2009 | Falvey | .................... | G07F 17/32 |
| | | | | 463/29 |
| 2010/0217992 A1* | 8/2010 | Hamlin | ................. | G06F 21/725 |
| | | | | 726/20 |
| 2013/0125240 A1* | 5/2013 | Xu | ....................... | G06F 21/105 |
| | | | | 726/26 |
| 2014/0133650 A1* | 5/2014 | Kinoshita | ............. | G06F 21/105 |
| | | | | 380/44 |
| 2015/0336005 A1* | 11/2015 | Melnick | .................. | A63F 13/73 |
| | | | | 463/29 |
| 2017/0357784 A1* | 12/2017 | Duda | .................... | G06F 21/105 |
| 2019/0192975 A1* | 6/2019 | Higgins | ............. | G07F 17/3227 |
| 2021/0118085 A1* | 4/2021 | Bushnell | ................... | H04L 9/50 |

* cited by examiner

CREATING LICENSE DONGLES IN THE FIELD

BACKGROUND

Embodiments described herein relate to electronic gaming machines ("EGMs"), and in particular to creating license dongles in the field, and related systems, devices, and methods.

An EGM can include a memory device having one or more software packages stored therein that are executable to initiate a game. In some examples, the EGM must have a valid license in order to initiate a corresponding game. To update a license for an existing game or provide a new license for a new game, a license and/or validation of the license is stored on a license dongle (e.g., a Universal Serial Bus ("USB") drive) by a licensor and physically shipped to an operator associated with the EGM. The operator can physically insert the license dongle into the EGM in order to provide the EGM with access to the license such that the EGM can imitate the corresponding game.

SUMMARY

According to an embodiment, an electronic gaming machine ("EGM") includes a processor circuit, a port coupled to the processor circuit, and a memory coupled to the processor circuit. The port is configured to communicatively couple to a license dongle. The license dongle is configured to store a license associated with a game. The license is usable to allow the game to be played on the EGM. The memory includes machine-readable instructions that, when executed by the processor circuit, cause the EGM to perform operations. The operations include providing an identifier of the license dongle to a separate entity. The operations further include, responsive to providing the identifier of the license dongle, receiving an indicator of the license associated with the game. The operations further include initiating the game on the EGM using the license.

According to some embodiments, a method of operating a device associated with an electronic gaming machine ("EGM") includes determining an identifier of a license dongle. The method further includes providing the identifier of the license dongle. The method further includes, responsive to providing the identifier of the license dongle, receiving an indicator of a license associated with a game playable on the EGM. The method further includes updating the license dongle to include the license.

According to some embodiments, a system includes a processor circuit and a memory coupled to the processor circuit. The memory includes machine-readable instructions that, when executed by the processor circuit, cause the processor circuit to perform operations. The operations include receiving a first message from a device associated with an electronic gaming machine ("EGM"). The first message includes an indication of an identifier of a license dongle associated with the EGM. The operations further include determining a license associated with a game that is playable on the EGM based on the identifier of the license dongle. The operations further include transmitting an indication of the license to the device.

DETAILED DESCRIPTION

Figure 1:
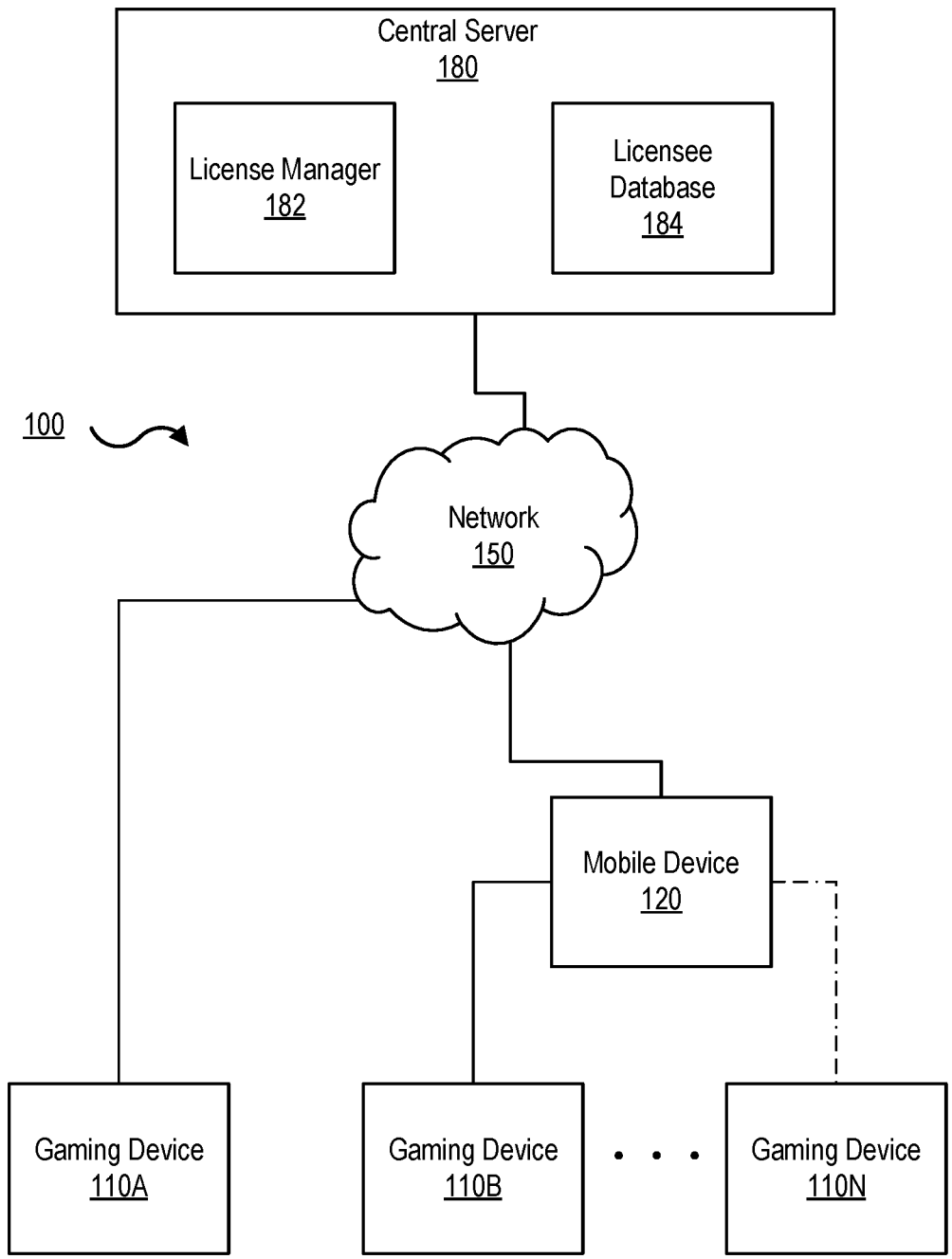
FIG. 1 is a block block diagram illustrating an example of a system for creating license dongles in the field according to some embodiments.

Embodiments described herein relate to electronic gaming machines (EGMs), and in particular to creating license dongles in the field, and related systems, devices, and methods. In some embodiments, a license dongle is created or updated without the need to physically ship license dongles between the gaming device (e.g., an EGM) and the licensor. In some embodiments, a game (e.g., a software package) and its associated license can be installed on an EGM without the need to physically ship any dongles (e.g., USB devices).

Physically shipping license dongles can be expensive and slow. Furthermore, using a new license dongle for each new/updated license can be an inefficient use of memory resources. Moreover, an EGM has a limited number of ports for coupling with license dongles, which can result in the need for the operator of the EGM to physically ship the current license dongles to the licensor to be combined. Since the EGM cannot initiate a game without a valid corresponding license, a period of time without the valid license is a period of time in which the EGM cannot provide the game, which can reduce the profitability of an EGM.

A license associated with a game installed on an EGM can be downloaded from a license server and installed onto an license dongle associated with an EGM instead of shipping USB drives (e.g., license dongles) for each game. This can reduce the cost of installing a license for games on an EGM, reduce the time to install a license for games on an EGM, and reduce the downtime of an EGMs while a license is being installed.

In some examples, the license dongle can be a secure USB device that stores licenses. The license can be a file that describes the packages to license. The license can allow packages to be enabled on the EGM. The license dongle can have a special password protected interface to copy files to and from the device.

In some embodiments, there are two concepts to the licensing mechanism: authentication and copy protection. Authentication can be achieved by having the licenses signed at a server associated with the licensor. Copy protection can be achieved by including a unique identifier from the hardware into the license.

The EGM can verify that the licenses are signed by the licensor and that the hardware is present. Currently the unique hardware identifier is the unique id on the USB license dongle (dongle id). The EGM ensures that the dongle id in the license matches the dongle installed into the gaming cabinet. To move a game between two cabinets, the license dongle must also be moved along with the licensed software package.

The copy protection can use another hardware identifier instead of the dongle id. For example, the hardware identifier can be a media access control ("MAC") address that is unique to each Ethernet controller. However, using the MAC address as the identifier would tie the license to the Ethernet controller. In some examples, the Ethernet controller is part of the motherboard in the brainbox of the EGM or another component attached to the motherboard (e.g., a PCI/USB/PCI Express Ethernet Controller) in the brainbox of the EGM. As a result, moving a game would require moving the brainbox or getting a new license from the licensor for the new brainbox.

In some embodiments, the EGM communicatively couples directly to a server associated with the licensor that can provide a license for a game installed on the EGM.

In additional or alternative embodiments, the EGM communicatively couples to the server associated with licensor via a mobile device. In some examples, access to an existing license dongle coupled to an EGMs is made by a mobile device via a connection between the mobile device and the EGM. In additional or alternative examples, access to an existing license dongle coupled to an EGM is made by a technician decoupling the license dongle from the EGM and coupling the license EGM to a mobile device.

FIG. 1 illustrates an example of a gaming system 100 including a central server 180 communicatively coupled to a plurality of gaming devices 110A, 110B, 110N. The gaming devices 110A, 110B, 110N may be one type of a variety of different types of gaming devices, such as electronic gaming machines ("EGMs"), mobile devices, or other devices, for example. In some examples, the gaming devices 110A, 110B, 110N can be located in a single premise (e.g., a casino) or multiple remote locations. In additional or alternative examples, the central server 180 can be located at a separate location from any of the gaming devices 110A, 110B, 110C. The gaming devices 110A, 110B, 110C may be in communication with each other and/or at least one central server 180 through a data communication network 150 that may include a remote communication link.

In the example illustrated in FIG. 1, gaming device 110A is communicatively coupled directly to the central server 180 via the data communication network 150. Gaming device 110B is communicatively coupled to the data communication network 150 (and the central server 180) via a connection (e.g., wired or wireless) with a mobile device 120. Examples of the mobile device 120 include a laptop or a mobile phone communicatively coupled to the gaming device 110B and the data communication network 150. The mobile device 120 can provide wireless access to the data communication network 150.

Figure 3:
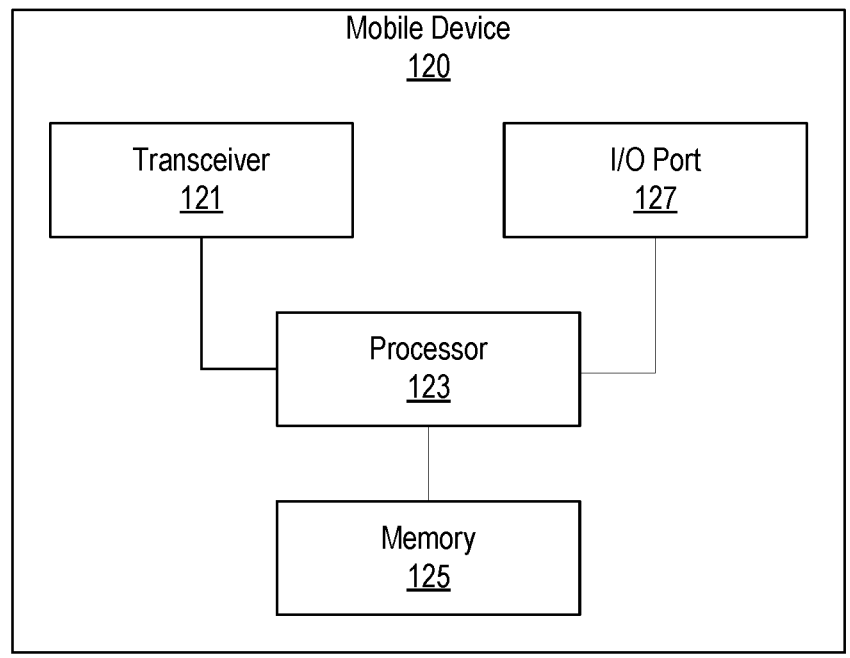
FIG. 3 is a block diagram illustrating an example of a mobile device according to some embodiments.

An example of a mobile device is illustrated in FIG. 3. The mobile device 120 includes a transceiver 121, an input/output ("I/O") port 127, processor circuit 123, and memory 125. In some examples, the transceiver 121 can communicatively couple to a central server via a network and communicatively couple to a gaming machine (e.g., via Bluetooth, WiFi, or ethernet). The I/O port 127 can include a port for inserting a license dongle and reading/writing to the license dongle. The memory 125 can include non-transitory computer-readable medium with instructions stored therein that are executable by the processor circuit 123 to cause the mobile device 120 to perform operations in accordance with embodiments herein.

Returning to FIG. 1, gaming device 110N can communicate with the central server 180 by exchanging a license dongle between the gaming device 110N and the mobile device 120. For example, the gaming device 110N can communicate with the central server 180 by: 1) a license dongle can be removed (e.g., decoupled) from the gaming device 110N; 2) the license dongle can be inserted (e.g., coupled) to the mobile device 120; 3) the mobile device 120 can communicate with the central server 180 via the data communication network 150 based on information on the license dongle; 4) the license dongle can be removed from the mobile device 120; and 5) the license dongle can be inserted into the gaming device 110N.

The data communication network 150 can include a private data communication network that is operated, for example, by the gaming facility that operates the gaming devices 110A, 110B, 110N and a public data communication network (e.g., the internet). Communications over the data communication network 150 may be encrypted for security.

The central server 180 is illustrated as including a license manager 182 and a licensee database 184, however, the central server 180 may be any suitable server or computing device that includes at least one processor circuit and at least one memory or storage device. The license manager 182 can be associated with a licensor of a specific game and can generate a signed/valid license associated with the specific game and a licensee. Information associated with the licensee can be stored in the licensee database 184. In some examples, the license manager 182 uses the information associated with the licensee to generate the license for a game. In additional or alternative examples, the license manager 182 uses information associated with the hardware (e.g., the gaming device 110A, 110B, 110N) that will run the game to generate the license for the game.

Figure 4:
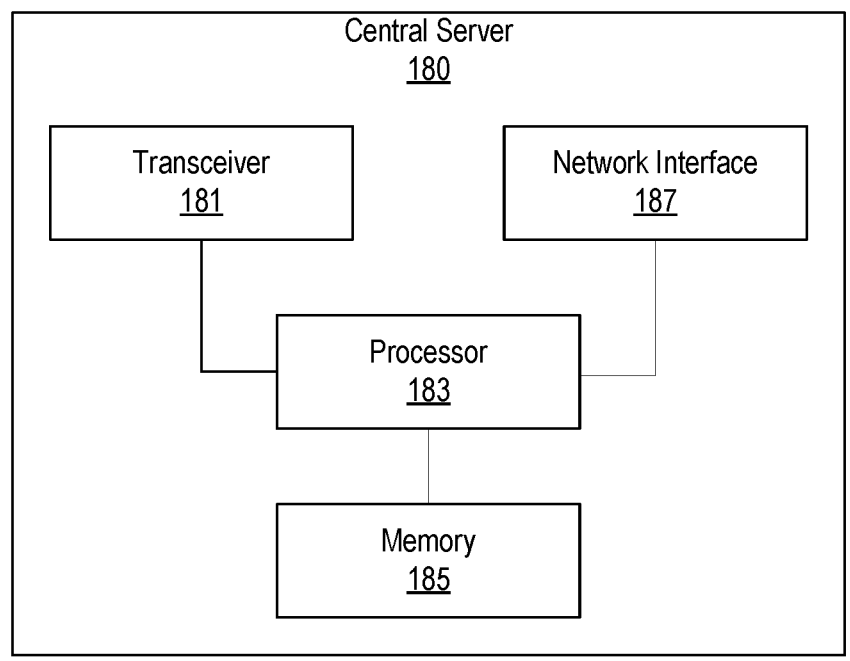
FIG. 4 is a block diagram illustrating an example of a central server according to some embodiments.

An example of a central server 180 is illustrated in FIG. 4. The central server 180 includes a transceiver 181, network interface 187, processor circuit 183, and memory 185. In some examples, the transceiver 181 communicatively couples the central server 180 to a gaming device (or an associated mobile device) via a network. The network interface 187 can communicatively couple the central server 180 to a license manager and/or a client database. In other examples, the license manager and the client database can be included in the central server 180. The memory 185 can include non-transitory computer-readable medium with instructions stored therein that are executable by the processor circuit 183 to cause the central server 180 to perform operations in accordance with embodiments herein.

Returning to FIG. 1, each gaming device 110A, 110B, 110N may include a processor circuit that transmits and receives events, messages, commands or any other suitable data or signal between the gaming device 110A, 110B, 110N and the central server 180. The gaming device processor circuit is operable to execute such communicated events, messages or commands in conjunction with the operation of the gaming device 110A, 110B, 110N. Moreover, the processor circuit of the central server 180 is configured to transmit and receive events, messages, commands or any other suitable data or signal between the central server 180 and each of the individual gaming devices 110A, 110B, 110N.

Figure 2A:
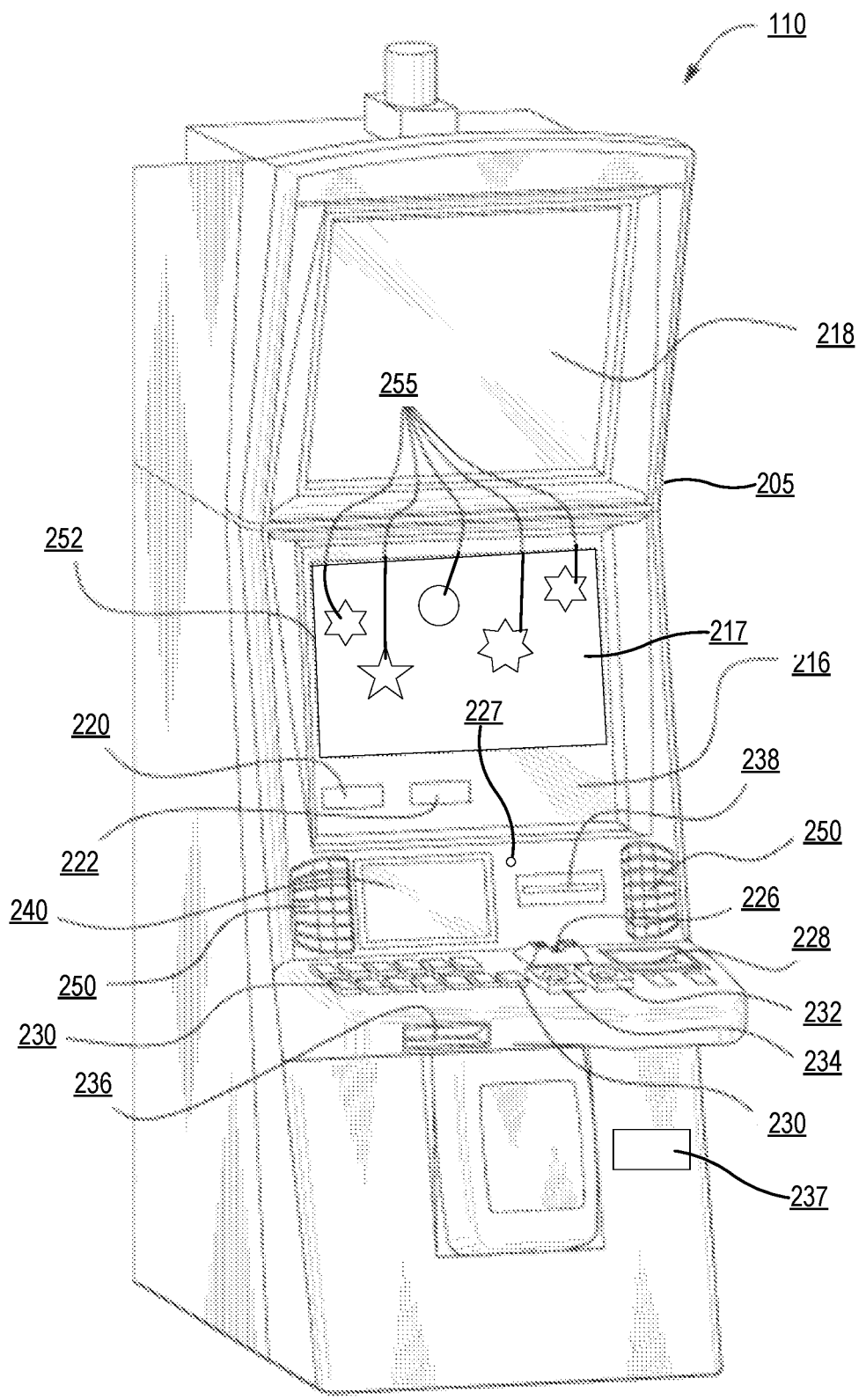
FIGS. 2A-E are diagrams illustrating examples of gaming devices according to various embodiments.
Figure 2B:
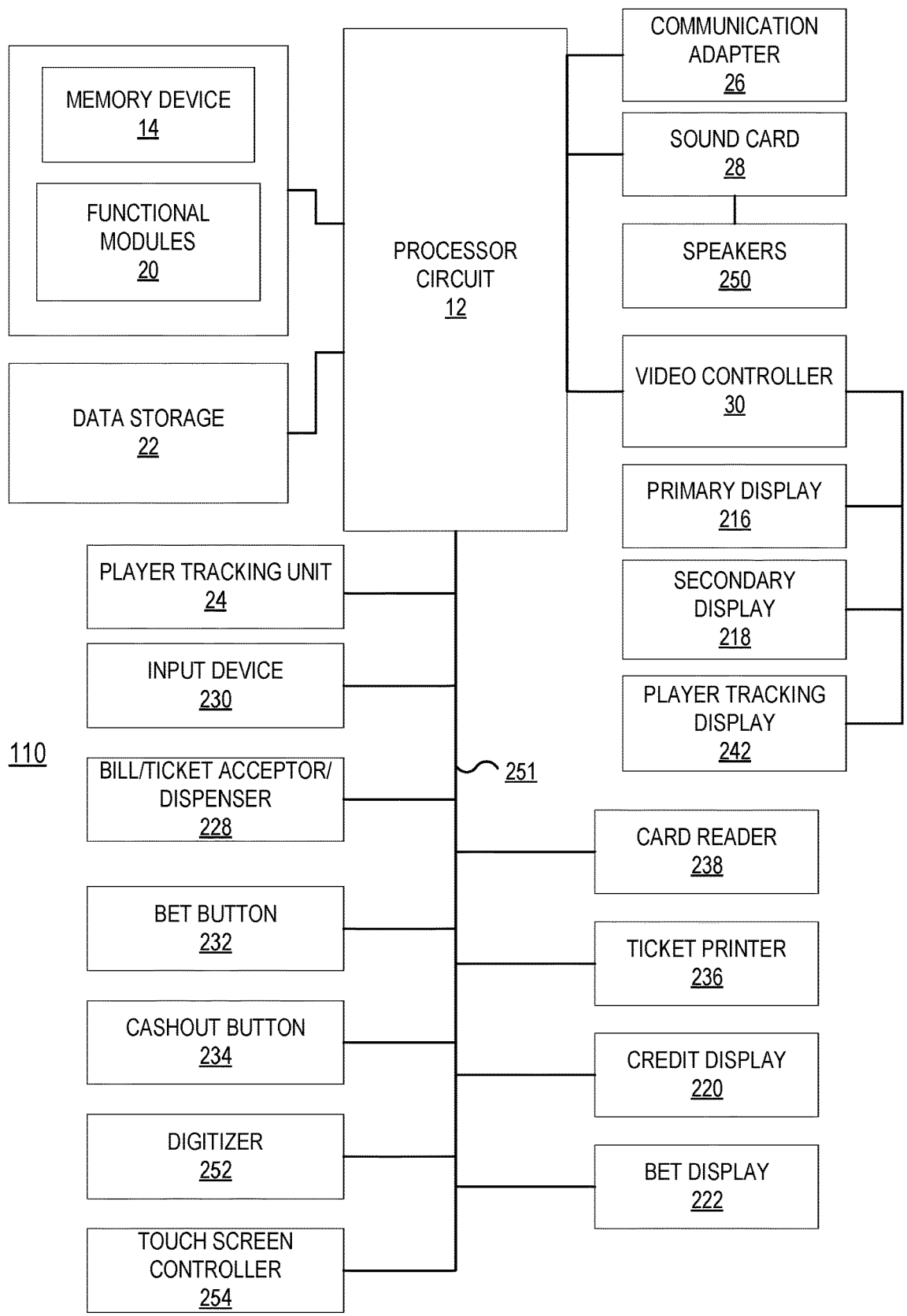
Figure 2C:
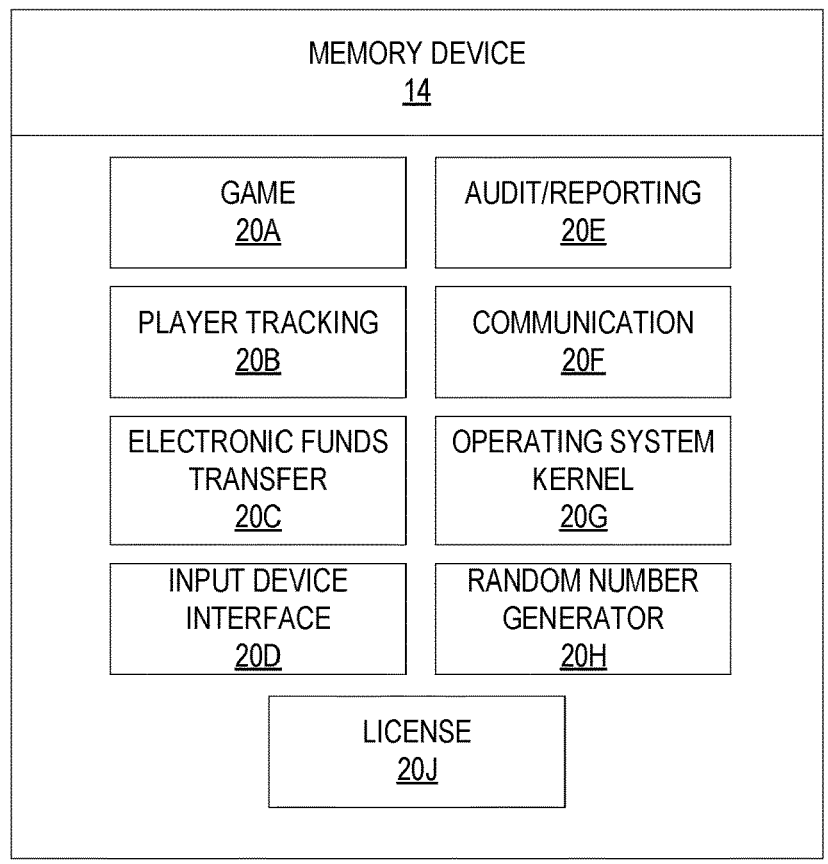

Embodiments herein may include different types of gaming devices. Various embodiments are illustrated in FIGS. 2A-C in which FIG. 2A is a perspective view of a gaming device 110 illustrating various physical features of the device, FIG. 2B is a functional block diagram that schematically illustrates an electronic relationship of various elements of the gaming device 110, and FIG. 2C illustrates various functional modules that can be stored in a memory device of the gaming device 110. The embodiments shown in FIGS. 2A-C are provided as examples for illustrative purposes only. It will be appreciated that gaming devices may come in many different shapes, sizes, layouts, form factors, and configurations, and with varying numbers and types of input and output devices, and that embodiments of the inventive concepts are not limited to the particular gaming device structures described herein.

Gaming devices 110 typically include a number of standard features, many of which are illustrated in FIGS. 2A-B. For example, referring to FIG. 2A, a gaming device 110 may include a support structure, housing 205 (e.g., cabinet) which provides support for a plurality of displays, inputs, outputs, controls and other features that enable a player to interact with the gaming device 110.

The gaming device 110 illustrated in FIG. 2A includes a number of display devices, including a primary display device 216 located in a central portion of the housing 205 and a secondary display device 218 located in an upper portion of the housing 205. A plurality of game components 255 are displayed on a display screen 217 of the primary display device 216. It will be appreciated that one or more of the display devices 216, 218 may be omitted, or that the display devices 216, 218 may be combined into a single display device. The gaming device 110 may further include a player tracking display 242, a credit display 220, and a bet display 222. The credit display 220 displays a player's current number of credits, cash, account balance or the equivalent. The bet display 222 displays a player's amount wagered. Locations of these displays are merely illustrative as any of these displays may be located anywhere on the gaming device 110.

The player tracking display 242 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 242, the credit display 220 and the bet display 222 may be displayed in one or more portions of one or more other displays that display other game related visual content. For example, one or more of the player tracking display 242, the credit display 220 and the bet display 222 may be displayed in a picture in a picture on one or more displays.

The gaming device 110 may further include a number of input devices 230 that allow a player to provide various inputs to the gaming device 110, either before, during or after a game has been played. The gaming device may further include a game play initiation button 232 and a cashout button 234. The cashout button 234 is utilized to receive a cash payment or any other suitable form of payment corresponding to a quantity of remaining credits of a credit display.

In some embodiments, one or more input devices of the gaming device 110 are one or more game play activation devices that are each used to initiate a play of a game on the gaming device 110 or a sequence of events associated with the gaming device 110 following appropriate funding of the gaming device 110. The example gaming device 110 illustrated in FIG. 2A-B includes a game play activation device in the form of a game play initiation button 232. It should be appreciated that, in other embodiments, the gaming device 110 begins game play automatically upon appropriate funding rather than upon utilization of the game play activation device.

In some embodiments, one or more input device 230 of the gaming device 110 may include wagering or betting functionality. For example, a maximum wagering or betting function may be provided that, when utilized, causes a maximum wager to be placed. Another such wagering or betting function is a repeat the bet device that, when utilized, causes the previously-placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 230 may include and/or interact with additional components, such as a touch-sensitive display that includes a digitizer 252 and a touchscreen controller 254 for touch input devices, as disclosed herein. The player may interact with the gaming device 110 by touching virtual buttons on one or more of the display devices 216, 218, 240. Accordingly, any of the above described input devices, such as the input device 230, the game play initiation button 232 and/or the cashout button 234 may be provided as virtual buttons or regions on one or more of the display devices 216, 218, 240.

Referring briefly to FIG. 2B, operation of the primary display device 216, the secondary display device 218 and the player tracking display 242 may be controlled by a video controller 30 that receives video data from a processor circuit 12 or directly from a memory device 14 and displays the video data on the display screen. The credit display 220 and the bet display 222 are typically implemented as simple LCD or LED displays that display a number of credits available for wagering and a number of credits being wagered on a particular game. Accordingly, the credit display 220 and the bet display 222 may be driven directly by the processor circuit 12. In some embodiments however, the credit display 220 and/or the bet display 222 may be driven by the video controller 30. The gaming device 110 may also include a player tracking unit 24 for managing communications and functionality between the processor circuit 12 and certain peripherals and components. Player tracking units 24 may be standardized across machine types to operate interchangeably across a manufacturer's lineup.

Referring again to FIG. 2A, the display devices 216, 218, 240 may include, without limitation: a cathode ray tube, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 216, 218, 240 may include a touch-screen with an associated touchscreen controller 254 and digitizer 252. The display devices 216, 218, 240 may be of any suitable size, shape, and/or configuration. The display devices 216, 218, 240 may include flat or curved display surfaces.

The display devices 216, 218, 240 and video controller 30 of the gaming device 110 are generally configured to display one or more game and/or non-game images, symbols, and indicia. In certain embodiments, the display devices 216,

218, 240 of the gaming device 110 are configured to display any suitable visual representation or exhibition of the movement of objects; dynamic lighting; video images; images of people, characters, places, things, and faces of cards; and the like. In certain embodiments, the display devices 216, 218, 240 of the gaming device 110 are configured to display one or more virtual reels, one or more virtual wheels, and/or one or more virtual dice. In other embodiments, certain of the displayed images, symbols, and indicia are in mechanical form. That is, in these embodiments, the display device 216, 218, 240 includes any electromechanical device, such as one or more rotatable wheels, one or more reels, and/or one or more dice, configured to display at least one or a plurality of game or other suitable images, symbols, or indicia.

The gaming device 110 also includes various features that enable a player to deposit credits in the gaming device 110 and withdraw credits from the gaming device 110, such as in the form of a payout of winnings, credits, etc. For example, the gaming device 110 may include a bill/ticket printer 236, a bill/ticket acceptor/dispenser 228, that allows the player to deposit and/or receive tickets and/or currency into the gaming device 110.

As illustrated in FIG. 2A, the gaming device 110 may also include a currency dispenser 237 that may include a note dispenser configured to dispense paper currency and/or a coin generator configured to dispense coins or tokens in a coin payout tray.

The gaming device 110 may further include one or more speakers 250 controlled by one or more sound cards 28 (FIG. 2B). The gaming device 110 illustrated in FIG. 2A includes a pair of speakers 250. In other embodiments, additional speakers, such as surround sound speakers, may be provided within or on the housing 205. Moreover, the gaming device 110 may include built-in seating with integrated headrest speakers.

In various embodiments, the gaming device 110 may generate dynamic sounds coupled with attractive multimedia images displayed on one or more of the display devices 216, 218, 240 to provide an audio-visual representation or to otherwise display full-motion video with sound to attract players to the gaming device 110 and/or to engage the player during gameplay. In certain embodiments, the gaming device 110 may display a sequence of audio and/or visual attraction messages during idle periods to attract potential players to the gaming device 110. The videos may be customized to provide any appropriate information.

The gaming device 110 may further include a card reader 238 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processor circuit determines the amount of funds entered and displays the corresponding amount on the credit or other suitable display as described above.

In some embodiments, the gaming device 110 may include an electronic payout device or module configured to fund an electronically recordable identification card or smart card or a bank or other account via an electronic funds transfer to or from the gaming device 110.

FIG. 2B is a block diagram that illustrates logical and functional relationships between various components of a gaming device 110. It should also be understood that components described in FIG. 2B may also be used in other computing devices, as desired, such as mobile computing devices for example. As shown in FIG. 2B, the gaming device 110 may include a processor circuit 12 that controls operations of the gaming device 110. Although illustrated as a single processor circuit, multiple special purpose and/or general purpose processors and/or processor cores may be provided in the gaming device 110. For example, the gaming device 110 may include one or more of a video processor, a signal processor, a sound processor and/or a communication controller that performs one or more control functions within the gaming device 110. The processor circuit 12 may be variously referred to as a "controller," "microcontroller," "microprocessor" or simply a "computer." The processor may further include one or more application-specific integrated circuits (ASICs).

Various components of the gaming device 110 are illustrated in FIG. 2B as being connected to the processor circuit 12. It will be appreciated that the components may be connected to the processor circuit 12 through a system bus 251, a communication bus and controller, such as a USB controller and USB bus, a network interface, or any other suitable type of connection.

The gaming device 110 further includes a memory device 14 that stores one or more functional modules 20. Various functional modules 20 of the gaming device 110 will be described in more detail below in connection with FIG. 2D.

The memory device 14 may store program code and instructions, executable by the processor circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 110 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, DVD or USB memory device. In some examples, the USB memory device is a license dongle that includes a license and/or information associated with the license. The license can be usable to operate a game on the gaming device 110.

The gaming device 110 may include a communication adapter 26 that enables the gaming device 110 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or near field communications (NFC) that enable the gaming device 110 to communicate, for example, with a mobile communication device operated by a player.

The gaming device 110 may include one or more internal or external communication ports that enable the processor circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb drives, ticket readers, touch screens, trackballs, touchpads, wheels, and wireless communication devices. In some embodiments, internal or external peripheral devices may communicate with the processor circuit through a universal serial bus (USB) hub (not shown) connected to the processor circuit 12.

In some embodiments, the gaming device 110 may include a sensor, such as a camera 227, in communication with the processor circuit 12 (and possibly controlled by the processor circuit 12) that is selectively positioned to acquire an image of a player actively using the gaming device 110 and/or the surrounding area of the gaming device 110. In one embodiment, the camera 227 may be configured to selectively acquire still or moving (e.g., video) images and may be configured to acquire the images in either an analog, digital or other suitable format. The display devices 216, 218, 240 may be configured to display the image acquired by the camera 227 as well as display the visible manifestation of the game in split screen or picture-in-picture fashion. For example, the camera 227 may acquire an image of the player and the processor circuit 12 may incorporate that image into the primary and/or secondary game as a game image, symbol or indicia.

Various functional modules of that may be stored in a memory device 14 of a gaming device 110 are illustrated in FIG. 2C. Referring to FIG. 2C, the gaming device 110 may include in the memory device 14 a game module 20A that includes program instructions and/or data for operating a hybrid wagering game as described herein. The gaming device 110 may further include a player tracking module 20B, an electronic funds transfer module 20C, an input device interface 20D, an audit/reporting module 20E, a communication module 20F, an operating system kernel 20G and a random number generator 20H. The gaming device 110 may further include a license module 20J that includes a license and/or information associated with a license for use when operating the game module 20A. The player tracking module 20B keeps track of the play of a player. The electronic funds transfer module 20C communicates with a back end server or financial institution to transfer funds to and from an account associated with the player. The input device interface 20D interacts with input devices, such as the input device 230, as described in more detail below. The communication module 20F enables the gaming device 110 to communicate with remote servers and other gaming devices using various secure communication interfaces. The operating system kernel 20G controls the overall operation of the gaming device 110, including the loading and operation of other modules. The random number generator 20H generates random or pseudorandom numbers for use in the operation of the hybrid games described herein.

Many embodiments described herein employ gaming devices 110 that are land-based EGMs, such as banks of slot machines in a casino environment, but in some embodiments, a gaming device 110 may additionally or alternatively include a personal device, such as a desktop computer, a laptop computer, a mobile device, a tablet computer or computing device, a personal digital assistant (PDA), or other portable computing devices. In some embodiments, the gaming device 110 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
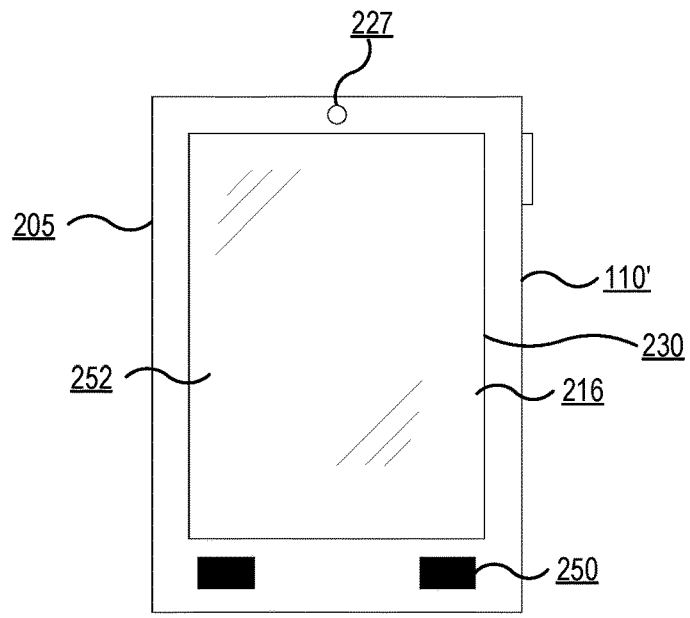

For example, referring to FIG. 2D, a gaming device 110' may be implemented as a handheld device including a compact housing 205 on which is mounted a touchscreen display device 216 including a digitizer 252. One or more input devices 230 may be included for providing functionality of for embodiments described herein. A camera 227 may be provided in a front face of the housing 205. The housing 205 may include one or more speakers 250. In the gaming device 110', various input buttons described above, such as the cashout button, gameplay activation button, etc., may be implemented as soft buttons on the touchscreen display device 216 and/or input device 230. In this embodiment, the input device 230 is integrated into the touchscreen display device 216, but it should be understood that the input device may also, or alternatively, be separate from the display device 216. Moreover, the gaming device 110' may omit certain features, such as a bill acceptor, a ticket generator, a coin acceptor or dispenser, a card reader, secondary displays, a bet display, a credit display, etc. Credits can be deposited in or transferred from the gaming device 110' electronically.

Figure 2E:
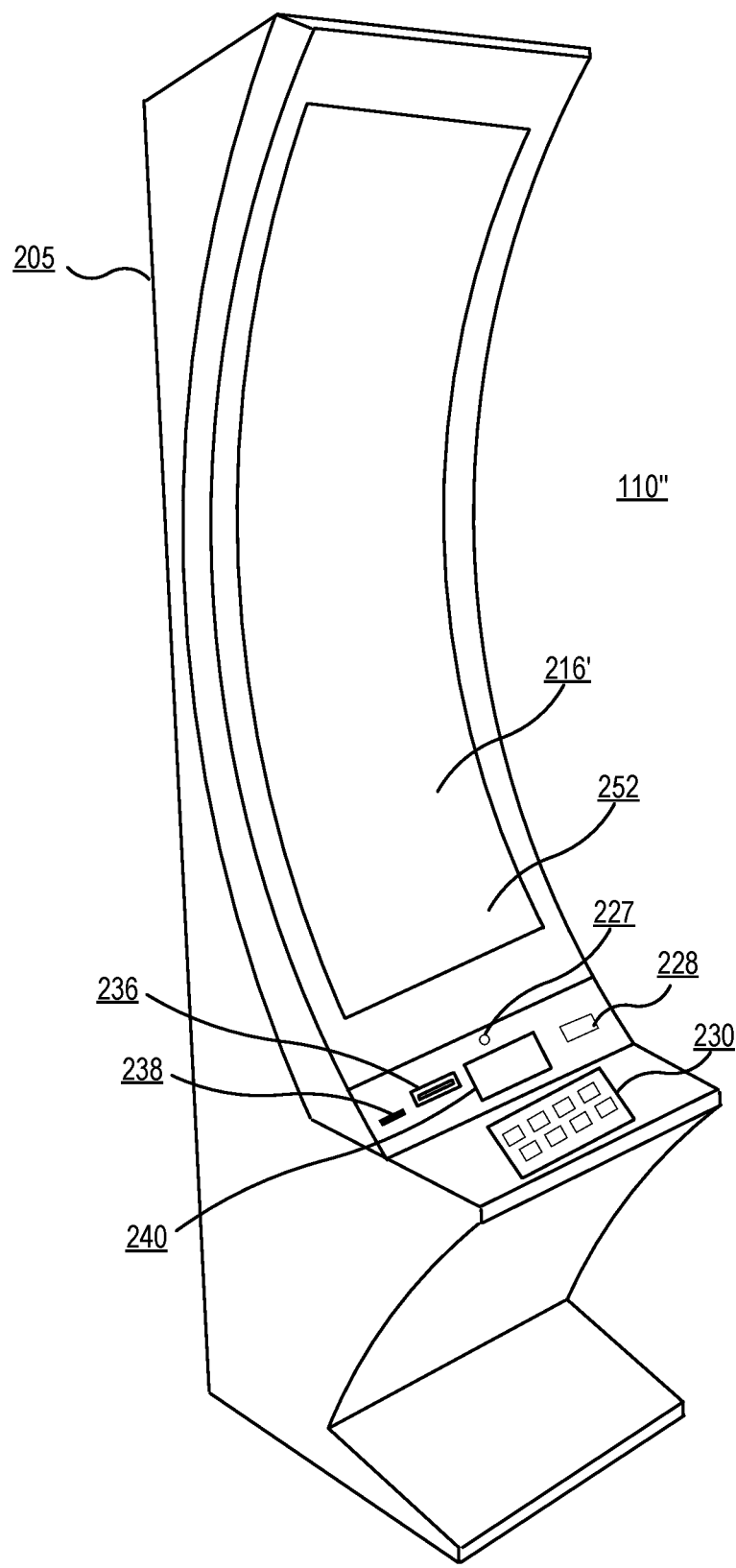

FIG. 2E illustrates a standalone gaming device 110", i.e., an EGM in this example, having a different form factor from the gaming device 110 illustrated in FIG. 2A. In particular, the gaming device 110" is characterized by having a large, high aspect ratio, curved primary display device 216' provided in the housing 105, with no secondary display device. The primary display device 216' may include a digitizer 252 to allow touchscreen interaction with the primary display device 216'. The gaming device 110" may further include a player tracking display 242, an input device 230, a bill/ticket acceptor 228, a card reader 238, and a bill/ticket dispenser 236. The gaming device 110" may further include one or more cameras 227 to enable facial recognition and/or motion tracking.

Although illustrated as certain gaming devices, such as electronic gaming machines (EGMs) and mobile devices, similar functions and/or operations as described herein may include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

FIGS. 5-9 illustrate signal flows for acquiring a license for a game package conversion. A conversion is a work order to change the list of games on a game device.

Figure 5:
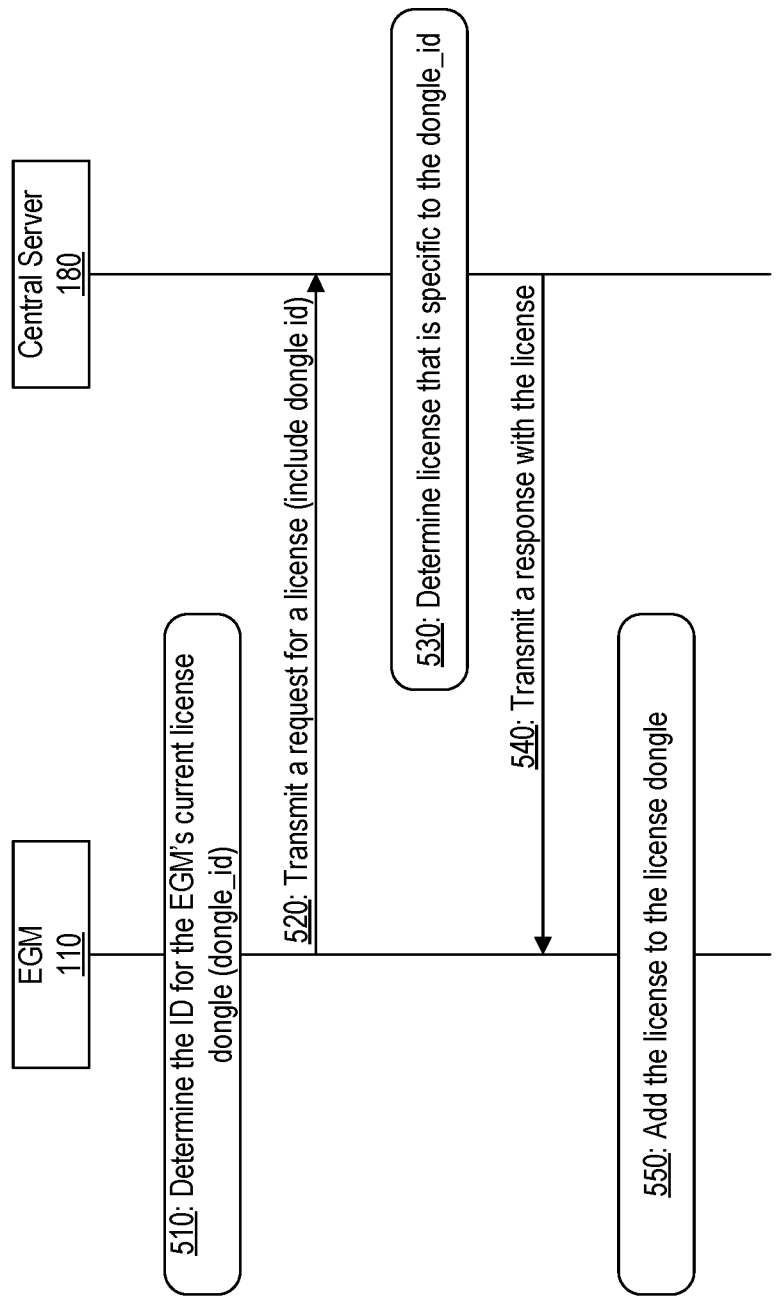
FIGS. 5-9 are signal flow diagrams illustrating examples of operations for creating a license dongle in the field according to some embodiments.

FIG. 5 illustrates an example of operations for creating a license dongle in the field when an EGM 110 is communicatively coupled directly with the central server 180. At block 510, the EGM 110 determines for an identifier ("ID") of a license dongle coupled to the EGM 110. The ID of the license dongle can be referred to as the dongle id. At block 520, EGM 110 transmits a request to the central server 180 for a license associated with a game to be run on the EGM 110. The request can include the dongle id, information regarding the game, and/or information regarding the licensee (e.g., the operator of the EGM 110). At block 530, central server 180 determines the license for the game based on the dongle id. At block 540, the central server 180 transmits the license to the EGM 110. At block 550, the EGM 110 adds the license to the license dongle.

Figure 6:
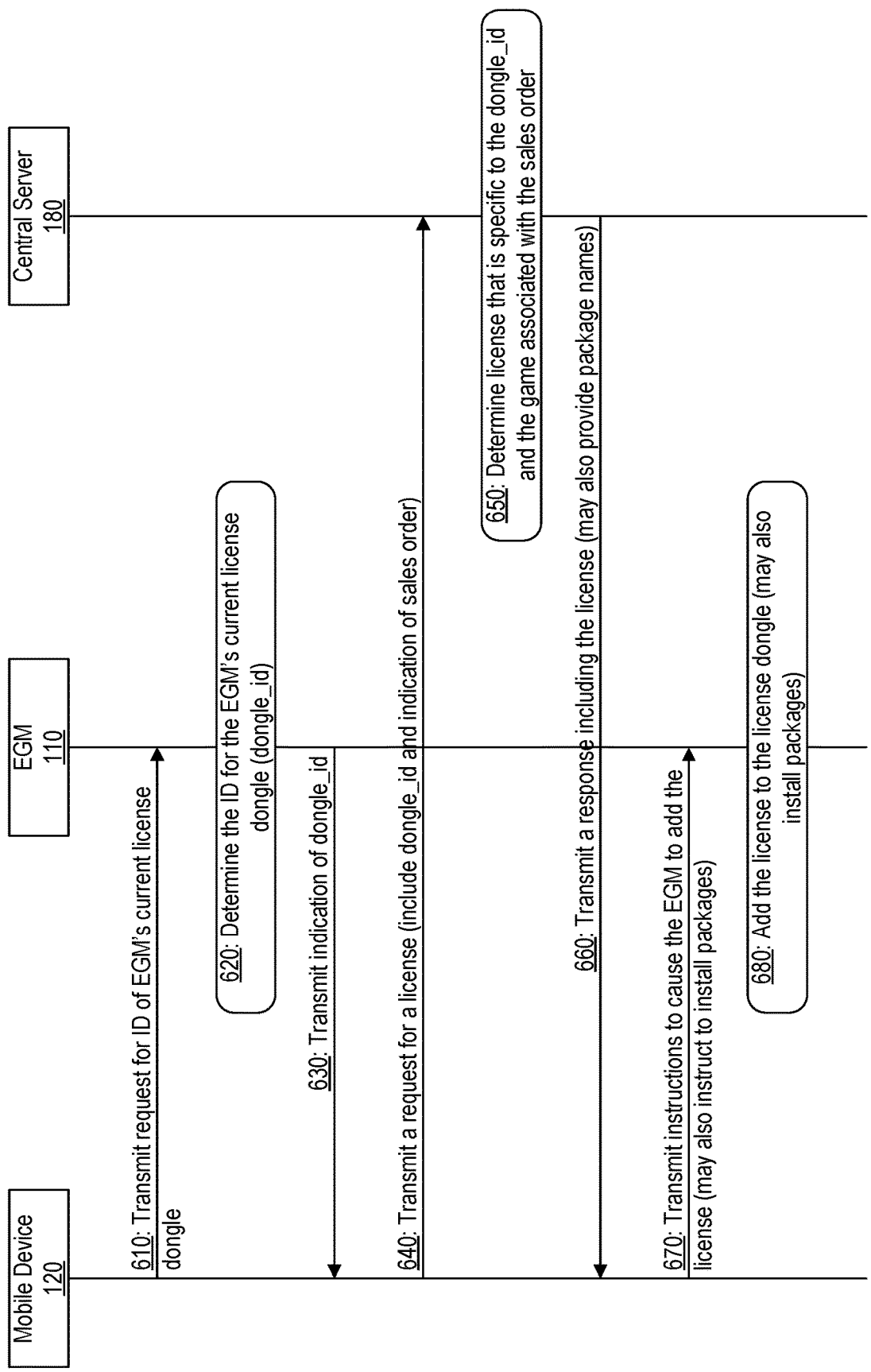

FIG. 6 illustrates an example of operations for creating a license dongle in the field when a mobile device 120 (e.g., associated with a technician) is communicatively coupled with the EGM 110. In some examples, the mobile device 120 is communicatively coupled to the EGM 110 by a wire (e.g., an ethernet cable). In additional or alternative examples, the mobile device 120 is communicatively coupled to the EGM 110 by a wireless connection (e.g., a Bluetooth Link; a WiFi link; or a NFC link).

At block 610, the mobile device 120 transmits a request for an ID of a license dongle associated with the EGM 110. At block 620, the EGM 110 determines the dongle id. At block 630, the EGM 110 transmits a message including the dongle id to the mobile device 120. At block 640, the mobile device 120 transmits a request for a license to the central server 180. In some examples, the request includes the dongle id. In additional or alternative examples, the request includes information associated with the operator of the EGM 110. The information can include a sales order for a game associated with the license. At block 650, the central server 180 determines the license that is specific to the dongle id and the game. At block 660, the central server 180 transmits the license to the mobile device 120. The central server 180 may further transmit information associated with the license and/or the game. In some examples, the information can include the game. At block 670, mobile device 120 transmits, to the EGM 110, the license and/or instructions to add the license to the license dongle. At block 680, the EGM 110 adds the license to the license dongle As illustrated in FIG. 6, in some embodiments, the license dongle is never removed, however, the net result is exactly the same as if a new license dongle were sent and installed into the EGM.

Figure 7:
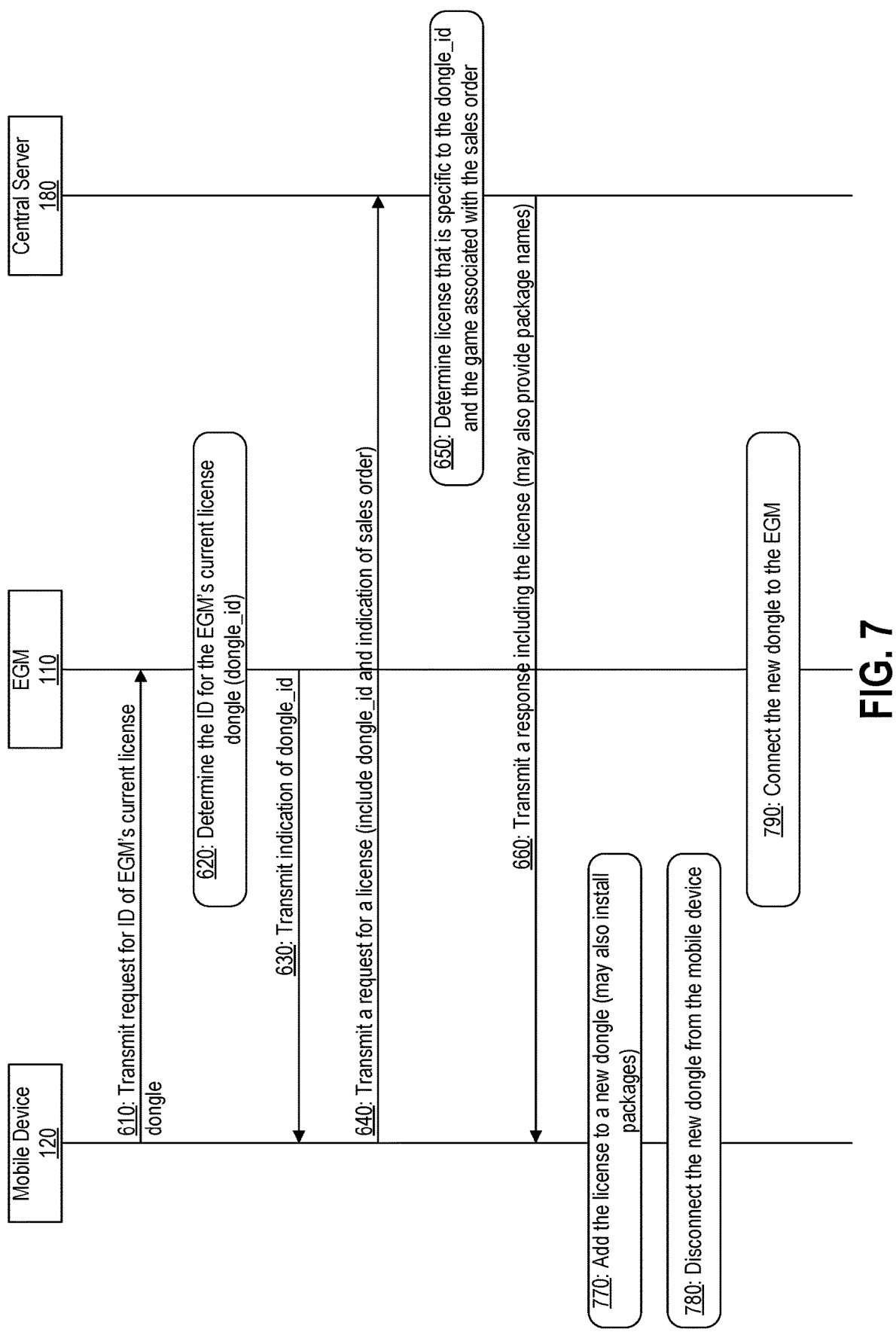

FIG. 7 illustrates another example of operations for creating a license dongle in the field when a mobile device 120 (e.g., associated with a technician) is communicatively coupled with the EGM 110. However, in FIG. 7, after block 660 (when the mobile device 120 receives the license from the central server 180), the mobile device adds the license to a new dongle (block 770). In some examples, the new dongle is the current license dongle after it has been removed from the EGM 110 and inserted into the mobile device 120. At block 780, the mobile device 120 disconnects the new dongle. At block 790, the EGM 110 connects to the new dongle.

Figure 8:
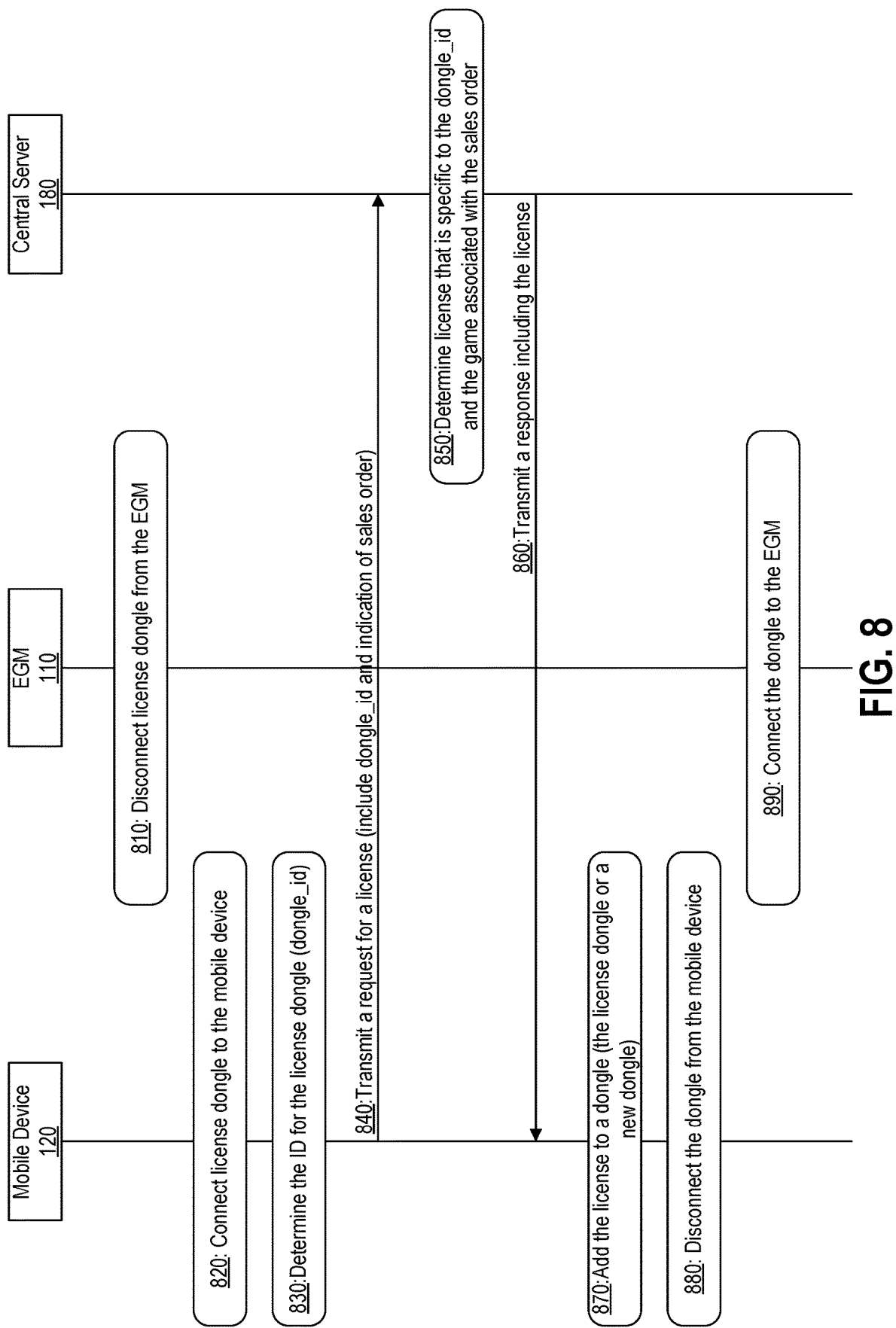

FIG. 8 illustrates an example of operations for creating a license dongle in the field when a mobile device 120 (e.g., associated with a technician) is communicatively coupled with the EGM 110 via exchange of portable drives (e.g., license dongles and USB drives).

At block 810, the EGM 110 disconnects the license dongle. At block 820, the mobile device 120 connects the license dongle. At block 830, the mobile device 120 determines the ID of the license dongle. At block 840, the mobile device 120 transmits a request for a license to the central server 180. In some examples, the request includes the dongle id. In additional or alternative examples, the request includes information associated with the operator of the EGM 110. The information can include a sales order for a game associated with the license. At block 850, the central server 180 determines the license that is specific to the dongle id and the game. At block 860, the central server 180 transmits the license to the mobile device 120. The central server 180 may further transmit information associated with the license and/or the game. In some examples, the information can include the game. At block 870, the mobile device adds the license to a new dongle. In some examples, the new dongle is the current license dongle. At block 880, the mobile device 120 disconnects the new dongle. At block 890, the EGM 110 connects to the new dongle.

In some embodiments, communication with the central server 180 (e.g., in FIGS. 5-9) requires logging in by providing credentials and/or a work order.

In additional or alternative embodiments, any game packages installed on the EGM are unaltered. In additional or alternative embodiments, the game packages are installed and/or updated at the same time as the license. In some examples, in FIGS. 6-9, the mobile device 120 can receive a list of game packages from the central server 180 and then install the license and packages all at once. In additional or alternative examples, the mobile device 120 can obtain all of the packages (e.g., from another source than the central server 180) and install them on a new dongle to connect to the EGM 110.

In additional or alternative embodiments, the central server 180 is capable of returning a license within a short period of time (e.g., within 1 minute) and can handle simultaneous requests from around the world.

In additional or alternative embodiments, the dongle id of each new cabinet can be created and stored in the SAP equipment record for that cabinet. When a work order is published, the packages are copied to a mobile device or USB drive. The work order can create the license dongle for the work order using the dongle id from the equipment record update. In this version the mobile device does not need to communicate with the central server while it is connected to the EGM. The mobile device can copy the packages and license file. If the dongle id has changed, the mobile device can request that it is reconnected to the EGM at which point the equipment record can be updated with the new dongle id.

In additional or alternative embodiments, the software (e.g., an operating system) on some EGMs may not be configured to be able to copy and/or update a license on a license dongle. This problem can be avoided by placing the EGM into a diagnostic mode (e.g., DIAGUNV) in order to install new licenses. A technician can acquire the new license, put in on a USB drive, boot the new DIAGUNV and instruct the DIAGUNV to copy the license from the USB drive to the license dongle.

Figure 9:
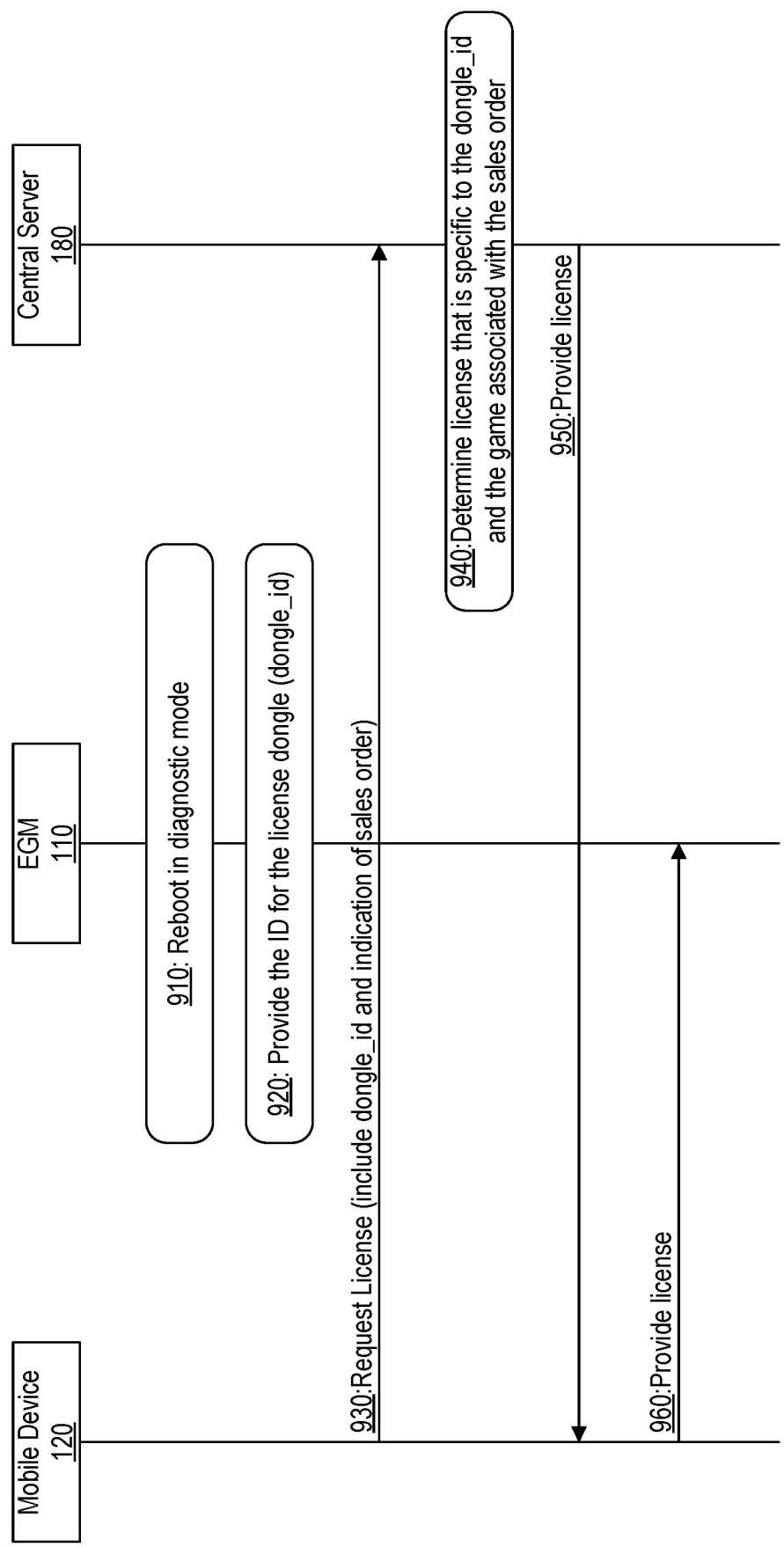

FIG. 9 illustrates an example of operations for creating a license dongle in the field while the EGM is in a diagnostic mode. At block 910, the EGM 110 reboots into diagnostic mode. At block 920, the EGM 110 provides the ID for the license dongle attached to the EGM 110. In some examples, the EGM 110 provides the dongle id to the mobile device 120 by transmitting the dongle id to the mobile device 120. In additional or alternative examples, the EGM 110 provides the license by disconnecting the license dongle and the mobile device 120 connecting to the license dongle. At block 930, the mobile device 120 transmits a request for a license to the central server 180. At block 940, the central server 180 determines a license associated with the dongle id and the corresponding game. At block 950, the central server 180 transmits a response to the mobile device 120. At block 960, the mobile device 120 provides the license to the EGM 110. In some examples, the mobile device 120 provides the license by transmitting the license to the EGM 110. In additional or alternative examples, the mobile device 120 provides the license by disconnecting a new license dongle having the license and the EGM 110 connecting to the new license dongle.

In some embodiments, the technician needs to acquire the license. In some examples, the technician can acquire the license from the equipment record as described above. The license can be automatically created with the dongle id when the work order is created. However, if the dongle id is not known by the Equipment Record Update flow, or the dongle has been moved a procedure must be created to contact the licensor, send the dongle id, and acquire the new license.

In some embodiments, the DIAGUNV contacts the licensor with the work order number and downloads the license. In some examples, the work order can be entered by the technician. In additional or alternative examples, the DIAGUNV could show the operator the dongle id. The operator could use a mobile device to download the license from the licensor using the work order and dongle ID.

In additional or alternative embodiments, a mobile device can be used to download the license from the central server and to write the license to a USB drive. Then the operator can boot the DIAGUNV with the USB drive and request that the DIAGUNV write the license from the USB drive to the license dongle.

In some embodiments, a game package and its corresponding license are replaced by a new game package and its corresponding license.

In additional or alternative embodiments, a game is added or removed from an EGM (also referred to herein as a gaming cabinet). In some examples, implementation of these embodiments must be considered in license generation. For example, if the desire is to have a work order add a Game package to the license, the license format may require the ability to support adding a license instead of replacing all licenses in the dongle.

In some embodiments, an EGM or mobile device can communicate with the central server using a web browser. In some examples, the central server hosts a web server for license updating. A web page provides the dongle id to the browser on the mobile device or the EGM. The operator can copy the dongle id and then paste that into another web page connected to the central server to request the license. The licensor webpage (e.g., hosted by the central server) can provide the license and a user (e.g., the technician or operator) can copy the license and paste that back into the web page associated with the EGM.

In additional or alternative embodiments, the license can be tied to the MAC address of the brain box (or another unique identifier of the EGM) instead of the dongle id.

In additional or alternative embodiments, to write to the license dongle, a special driver is requested along with user credentials. If the operating system or diagnostic mode of the EGM will write to the dongle, those software packages will require the user credentials and software drivers. However, if the passwords are embedded into the software, it is possible for somebody to extract them from the package images. To bypass the licensing requirement, a bad actor would need to sign the licenses which requires a private key associated with the licensor. That key can be maintained by the licensor and/or central server and never accessible to anyone in the field.

In some embodiments, the licenses are shown in plain text to the operator. In some examples, the license format is json with a signature. There is no security risk in allowing the operator to see the text since the content is signed at the central server.

In additional or alternative embodiments, it is possible that software on the EGM requires a username and password to update the license. It is also possible that the software requires the door on the EGM to be open or other measures to access higher security levels (such as an eKey).

Operations of the gaming device 110 (implemented using the structure of FIGS. 2A-E) will now be discussed with reference to the flow chart of FIG. 10 according to some embodiments of inventive concepts. For example, modules may be stored in memory device 14 of FIGS. 2B-C, and these modules may provide instructions so that when the instructions of a module are executed by respective communication device processing circuit 12, processing circuitry 12 performs respective operations of the flow chart.

Figure 10:
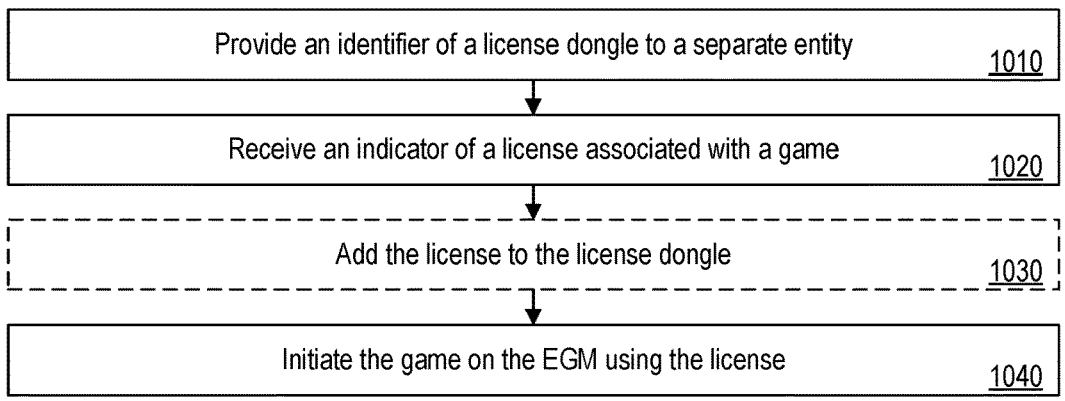
FIG. 10 is a flow chart illustrating an example of operations performed by an EGM according to some embodiments.

FIG. 10 is a flowchart illustrating an example of operations performed by an EGM.

At block 1010, processor circuit 12 provides an identifier of the license dongle to a separate entity. In some embodiments, the separate entity includes at least one of: a central server associated with a licensor of the game; and a mobile device configured to communicate with the central server.

In additional or alternative embodiments, the EGM includes a display device and the separate entity includes a mobile device. Providing the identifier of the license dongle includes displaying the identifier of the license dongle on a display device within view of a user of the mobile device.

At block 1020, processor circuit 12, responsive to providing the identifier of the license dongle receives an indicator of the license associated with the game. In some embodiments, providing the identifier of the license dongle includes transmitting, via a transceiver (e.g., the communication adapter 26), a first message to the separate entity, the first message including the identifier of the license dongle.

In additional or alternative embodiments, receiving the indicator of the license associated with the game includes receiving, via the transceiver, a second message from the separate entity, the second message including the indicator of the license.

In additional or alternative embodiments, receiving the indicator of the license associated with the game includes detecting that a new dongle has been coupled to the port and that the new dongle comprises the license. In additional or alternative embodiments, receiving the indicator of the license associated with the game includes detecting that the license dongle has been coupled to the port and that the license dongle includes the license.

At block 1030, processor circuit 12 adds the license to the license dongle.

At block 1040, processor circuit 12 initiates the game on the EGM using the license.

Various operations of FIG. 10 may be optional. For example the operations of block 1030 may be optional.

Operations of a mobile device 120 (implemented using the structure of FIG. 3) will now be discussed with reference to the flow chart of FIG. 11 according to some embodiments of inventive concepts. For example, modules may be stored in memory device 125 of FIG. 3, and these modules may provide instructions so that when the instructions of a module are executed by respective communication device processing circuit 123, processing circuitry 123 performs respective operations of the flow chart. Although FIG. 11 is described below as being performed by mobile device 120, any suitable device may perform the operations (e.g., gaming device 110 in FIGS. 2A-E.

Figure 11:
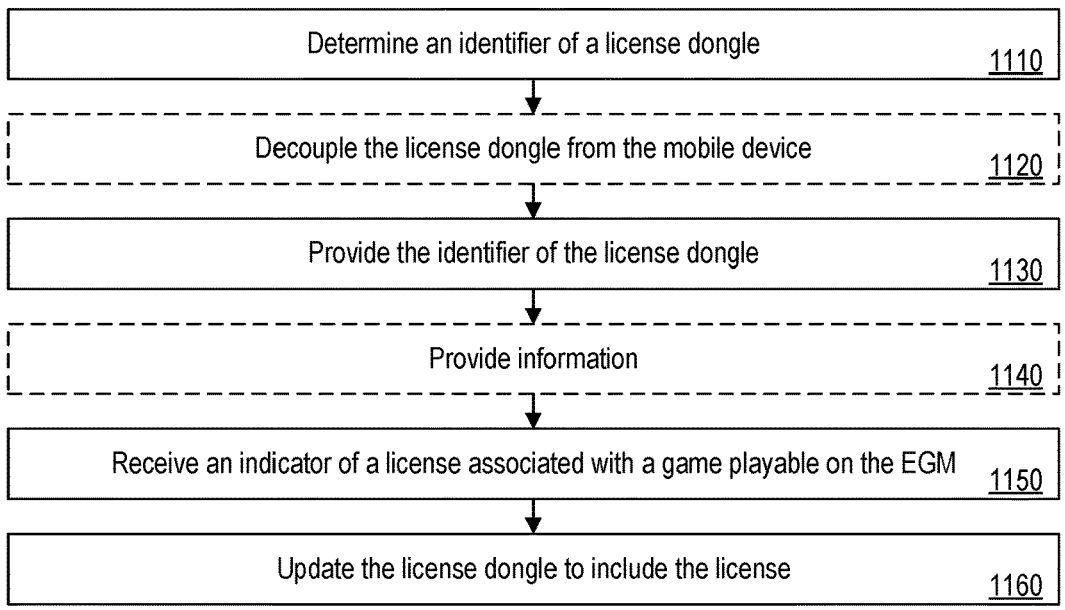
FIG. 11 is a flow chart illustrating an example of operations performed by an EGM or a mobile device according to some embodiments.

FIG. 11 is a flowchart illustrating an example of operations performed by a device associated with an EGM.

At block 1110, processor circuit 123 determines an identifier of a license dongle.

In some embodiments, the device is a mobile device separate from the EGM. In some examples, determining the identifier of the license dongle includes coupling the license dongle to the mobile device. At block 1120, processor circuit 123 decouples the license dongle form the mobile device.

At block 1130, processor circuit 123 provides the identifier of the license dongle. In some embodiments, the device includes the EGM and a license dongle is coupled to the EGM.

At block 1140, processor circuit 123 provides information. In some embodiments, the information is associated with at least one of: the game; a purchase order for the game; and a licensee associated with the game.

At block 1150, processor circuit 123 receives an indicator of a license associated with a game playable on the EGM.

At block 1160, processor circuit 123 updates the license dongle to include the license.

In some embodiments, the device includes the EGM and a license dongle is coupled to the EGM.

In some examples, providing the identifier of the license dongle includes displaying the identifier of the license dongle on a display screen of the EGM. In additional or alternative embodiments, receiving the indicator of the license includes receiving the indicator of the license from a mobile device communicatively coupled to the EGM and a central server associated with a licensor of the game.

In additional or alternative examples, providing the identifier of the license dongle includes transmitting an indication of the identifier of the license dongle to a central server associated with a licensor of the game. Receiving the license includes receiving the license from the central server.

In additional or alternative examples, transmitting the indication of the identifier of the license dongle to the central server associated with the licensor of the game includes transmitting the indication of the identifier of the license dongle to the central server via a mobile device communicatively coupled to the EGM. Receiving the license from the central server includes receiving the license from the central server via the mobile device.

In some embodiments, the device includes a mobile device communicatively coupled to the EGM.

In some examples, the license dongle can be coupled to the EGM and determining the identifier of the license dongle coupled to the EGM includes receiving an indication of the identifier of the license dongle from the EGM.

In additional or alternative examples, providing the identifier of the license dongle includes transmitting an indication of the identifier of the license dongle to a central server associated with the licensor of the game. Receiving the indicator of the license includes receiving the indicator of the license from the central server. Updating the license dongle to include the license includes transmitting the indicator of the license to the EGM.

Various operations of FIG. 11 may be optional. For example the operations of blocks 1120 and 1140 may be optional.

Operations of a central server 180 (implemented using the structure of FIG. 4) will now be discussed with reference to the flow chart of FIG. 12) according to some embodiments of inventive concepts. For example, modules may be stored in memory device 185 of FIG. 4, and these modules may provide instructions so that when the instructions of a module are executed by respective communication device processing circuit 183, processing circuitry 183 performs respective operations of the flow chart. Although FIG. 12 is described below as being performed by central server 180, any suitable device (e.g., gaming system 100) may perform the operations.

Figure 12:
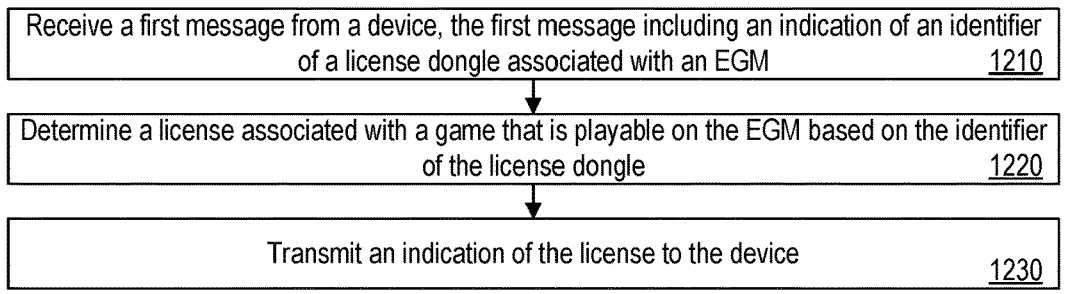
FIG. 12 is a flow chart illustrating an example of operations performed by a system according to some embodiments.

FIG. 12 is a flowchart illustrating an example of operations performed by a system.

At block 1210, processor circuit 183 receives, via transceiver 181, a first message from a device, the first message including an indication of an identifier of a license dongle associated with an EGM.

At block 1220, processor circuit 183 determines a license associated with a game that is playable on the EGM based on the identifier of the license dongle. In some embodiments, the first message further includes information associated with at least one of: the game; a purchase order for the game; and a licensee associated with the game. Determining the license includes determining the license based on the information.

At block 1230, processor circuit 183 transmits, via transceiver 181, an indication of the license to the device.

In some embodiments, the device includes at least one of: the EGM; the mobile device communicatively coupled to the EGM; the mobile device configured to add the license to the license dongle; and the mobile device configured to add the license to a new dongle.

Various operations of FIG. 12 may be optional.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (Saas).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks. The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. An electronic gaming machine ("EGM") comprising:
   a processor circuit;
   a port coupled to the processor circuit and configured to communicatively couple to a license dongle, the license dongle configured to store a license associated with a game, the license being usable to allow the game to be played on the EGM; and a memory coupled to the processor circuit, the memory comprising machine-readable instructions that, when executed by the processor circuit, cause the EGM to perform operations comprising:
  providing information to a separate entity, the information including:
    an identifier of the license dongle;
    an indication of the game; and
    an indication of a licensee associated with the game;
  responsive to providing the information, receiving an indicator of the license associated with the game; and
  initiating the game on the EGM using the license.

2. The EGM of claim 1, wherein the EGM further comprises a transceiver,
  wherein providing the information comprises transmitting, via the transceiver, a first message to the separate entity, the first message comprising the information.

3. The EGM of claim 2, wherein the separate entity comprises at least one of:
  a central server associated with a licensor of the game; and
  a mobile device configured to communicate with the central server.

4. The EGM of claim 2, wherein receiving the indicator of the license associated with the game comprises receiving, via the transceiver, a second message from the separate entity, the second message comprising the indicator of the license,
  wherein the operations further comprise:
    adding the license to the license dongle.

5. The EGM of claim 1, wherein the EGM further comprises a display device,
  wherein the separate entity comprises a mobile device, and
  wherein providing the information comprises displaying the information on a display device within view of a user of the mobile device.

6. The EGM of claim 1, wherein receiving the indicator of the license associated with the game comprises detecting that at least one of:
  a new dongle has been coupled to the port and that the new dongle comprises the license; and
  the license dongle has been coupled to the port and that the license dongle comprises the license.

7. A method of operating a device associated with an electronic gaming machine ("EGM"), the method comprising:
  determining an identifier of a license dongle;
  providing information including:
    the identifier of the license dongle;
    an indication of the game; and
    an indication of a licensee associated with the game;
  responsive to providing the information, receiving an indicator of a license associated with a game playable on the EGM; and
  updating the license dongle to include the license.

8. The method of claim 7, wherein the device comprises the EGM, and
  wherein the license dongle is coupled to the EGM.

9. The method of claim 8, wherein providing the information comprises displaying the information on a display screen of the EGM, and
  wherein receiving the indicator of the license comprises receiving the indicator of the license from a mobile device communicatively coupled to the EGM and a central server associated with a licensor of the game.

10. The method of claim 8, wherein providing the information comprises transmitting an indication of the information to a central server associated with a licensor of the game, and
  wherein receiving the indicator of the license comprises receiving the indicator of the license from the central server.

11. The method of claim 10, wherein transmitting the indication of the information to the central server associated with the licensor of the game comprises transmitting the indication of the information to the central server via a mobile device communicatively coupled to the EGM, and
  wherein receiving the indicator of the license from the central server comprises receiving the indicator of the license from the central server via the mobile device.

12. The method of claim 7, wherein the device comprises a mobile device communicatively coupled to the EGM.

13. The method of claim 12, wherein the license dongle is coupled to the EGM, and
  wherein determining the identifier of the license dongle coupled to the EGM comprises receiving an indication of the identifier of the license dongle from the EGM.

14. The method of claim 13, wherein providing the information comprises transmitting an indication of the information to a central server associated with the licensor of the game, and
  wherein receiving the indicator of the license comprises receiving the indicator of the license from the central server.

15. The method of claim 14, wherein updating the license dongle to include the license comprises transmitting the indicator of the license to the EGM.

16. The method of claim 12, wherein determining the identifier of the license dongle comprises coupling the license dongle to the mobile device,
  the method further comprising:
    decoupling the license dongle from the mobile device.

17. The method of claim 7, wherein the information further includes an indication of a purchase order for the game.

18. A system comprising:
  a processor circuit; and
  a memory coupled to the processor circuit, the memory comprising machine-readable instructions that, when executed by the processor circuit, cause the processor circuit to perform operations comprising:
    receiving a first message from a device associated with an electronic gaming machine ("EGM"), the first message comprising:
      an indication of an identifier of a license dongle associated with the EGM;
      an indication of the game; and
      an indication of a licensee associated with the game;
    determining a license associated with a game that is playable on the EGM based on the identifier of the license dongle, the indication of the game, and the indication of the licensee associated with the game; and
    transmitting an indication of the license to the device.

19. The system of claim 18, wherein the first message further comprises an indication of a purchase order for the game, and
  wherein determining the license comprises determining the license based on the indication of the purchase order for the game.

20. The system of claim 18, wherein the device comprises at least one of:

the EGM;
a mobile device communicatively coupled to the EGM;
the mobile device configured to add the license to the license dongle; and
the mobile device configured to add the license to a new dongle.

\* \* \* \* \*